United States Patent
Christoffersen et al.

(10) Patent No.: US 6,588,727 B2
(45) Date of Patent: Jul. 8, 2003

(54) ELECTRIC DISPENSING VALVE INCLUDING IMPROVED PADDLE ARM

(75) Inventors: Steven R. Christoffersen, San Antonio, TX (US); Samuel Durham, San Antonio, TX (US); Richard M. Boyd, St. Louie Park, MN (US)

(73) Assignee: Lancer Partnership, Ltd., San Antonio, TX (US)

( * ) Notice: Subject to any disclaimer, the term of this patent is extended or adjusted under 35 U.S.C. 154(b) by 0 days.

(21) Appl. No.: 09/965,656

(22) Filed: Sep. 27, 2001

(65) Prior Publication Data

US 2003/0057393 A1 Mar. 27, 2003

(51) Int. Cl.[7] .................................................. F16K 1/16
(52) U.S. Cl. ..................................... 251/129.2; 251/303
(58) Field of Search .............................. 251/129.2, 298, 251/303; 222/556, 557

(56) References Cited

U.S. PATENT DOCUMENTS

| 3,678,902 A | * | 7/1972 | Ruth | 222/556 |
|---|---|---|---|---|
| 4,131,142 A | * | 12/1978 | Barr et al. | 251/303 |
| 4,610,425 A | * | 9/1986 | Kelly | 251/129.2 |
| 4,832,078 A | * | 5/1989 | Szekely et al. | 251/303 |
| 4,898,308 A | * | 2/1990 | Rudick | 222/556 |
| 5,556,073 A | * | 9/1996 | Wawro et al. | 251/303 |
| 5,810,327 A | * | 9/1998 | Lutz | 251/303 |
| 5,876,014 A | * | 3/1999 | Noritake et al. | 251/303 |

* cited by examiner

Primary Examiner—Ehud Gartenberg
Assistant Examiner—John Bastianelli
(74) Attorney, Agent, or Firm—Christopher L. Makay

(57) ABSTRACT

A dispensing valve includes a platform, a product inlet supported on the platform, and a product outlet supported on the platform. A flow rate controller receives product from the product inlet and communicates product to the product outlet. A paddle arm disposed at an outlet from the flow rate controller moves from a closed position stopping product flow to an open position allowing product flow. The paddle arm includes a base and a seal mounted on the base. The base includes a lever portion, a seal-retaining portion, and a seal retaining support ridge disposed on the lever portion. The seal includes an outer sealing member supported on the base at the seal retaining support ridge and an inner sealing block supported on the seal-retaining portion. An actuator moves the paddle arm to its open position, while a biasing mechanism returns the paddle arm to its closed position.

27 Claims, 3 Drawing Sheets

ELECTRIC DISPENSING VALVE INCLUDING IMPROVED PADDLE ARM

BACKGROUND OF THE INVENTION

1. Field of the invention

The present invention relates to dispensing valves and, more particularly, but not by of limitation, to a dispensing valve including an improved paddle arm.

2. Description of the Related Art

Dispensing valves typically include a platform supporting the various components of the valve, which include an inlet communicating with a flow rate controller that communicates with an outlet. Dispensing valves further include a solenoid and a biasing mechanism utilized to operate a paddle arm, which is also termed banjo valve, disposed between the flow rate controller and the outlet. The paddle arm starts and stops the flow of product through the dispensing valve. In operation, a user input signal to the dispensing valve facilitates the energizing of the solenoid, which then manipulates the paddle arm, thereby moving the paddle arm from a closed position blocking the outlet to an open position that permits product flow through the dispensing valve. Upon the ceasing of the user input signal, the solenoid denergizes, thus allowing the biasing mechanism to return the paddle arm to its normally closed position.

FIG. 1 illustrates a paddle arm current 10 currently employed in dispensing valves. The paddle arm 10 consists of a seal 11 supported on a base 12. The seal 11 consists of an outer sealing ring 13 that seals the outer edge of the outlet and an inner sealing block 14 that moves from a closed position sealing the outlet to an open position permitting product flow.

Although the paddle arm 10 operates adequately under certain circumstances, such paddle arms still suffer disadvantages. Illustratively, increased product flow rates create a "water hammer" effect that damages the paddle arm 10 as it continuously moves between its closed and open positions. Such movement flexes the paddle arm 10 at the joint between the outer sealing ring 13 and the base 12, resulting in ruptures in the outer sealing ring 13 (i.e., "blowout") that lead to product leakage and the requisite replacement of the paddle: arm 10. Further, the use of chloramines to treat water employed in forming a product causes the seal 11 to swell thereby diminishing or interrupting product flow from a dispensing valve.

Accordingly, a dispensing valve including an improved paddle arm that resists "blowout" as well as swelling caused by the use of chloramines improves over paddle arms utilized in related art dispensing valves.

SUMMARY OF THE INVENTION

In accordance with the present invention, a dispensing valve includes a platform, a product inlet supported on the platform, and a product outlet supported on the platform. A flow rate controller receives product from the product inlet and communicates product to the product outlet. A paddle arm disposed at an outlet from the flow rate controller moves from a closed position stopping product flow to an open position allowing product flow. The paddle arm includes a base and a seal mounted on the base. An actuator moves the paddle arm to its open position, while a biasing mechanism returns the paddle arm to its closed position.

The base includes a lever portion, a seal-retaining portion, and a seal retaining support ridge disposed on the lever portion to provide greater support and stability for the outer sealing member at its connection point to the base. The base further includes a second seal retaining support ridge disposed on the lever portion to provide greater support and stability for the outer sealing member at its connection point to the base. The lever portion includes a seal-retaining aperture that provides greater support and stability to the seal at its connection point to the base. The seal-retaining portion defines a through hole that provides the inner sealing block with better sealing characteristics. The edges of the base are radiused or angled to prevent the abrading of a yoke attached thereto.

The seal includes an outer sealing member supported on the base at the seal retaining support ridge and an inner sealing block supported on the seal-retaining portion. The outer sealing member and the inner sealing block are integrally connected via a bridge. The inner sealing block includes an angled or radiused edge that enhances product flow past the inner sealing block.

It is therefore an object of the present invention to provide a dispensing valve with an improved paddle arm that resists "blowout".

It is another object of the present invention to provide a dispensing valve with an improved paddle arm that resists chloramines.

It is a further object of the present invention to provide a dispensing valve with an improved paddle arm with better sealing and flow characteristics.

Still other objects, features, and advantages of the present invention will become evident to those of ordinary skill in the art in light of the following.

DETAILED DESCRIPTION OF THE PREFERRED EMBODIMENT

Figure 1:
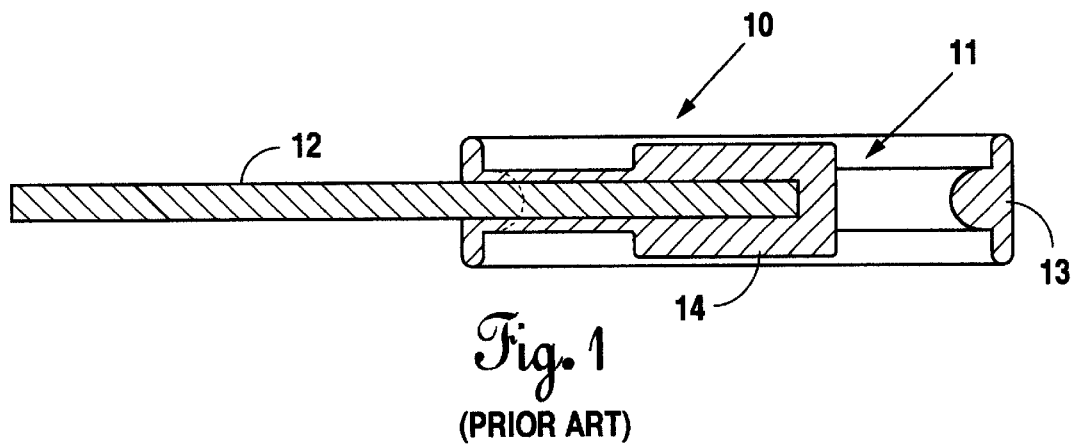
FIG. 1 is a cross-sectional view illustrating a paddle arm according to the related art.
Figure 2:
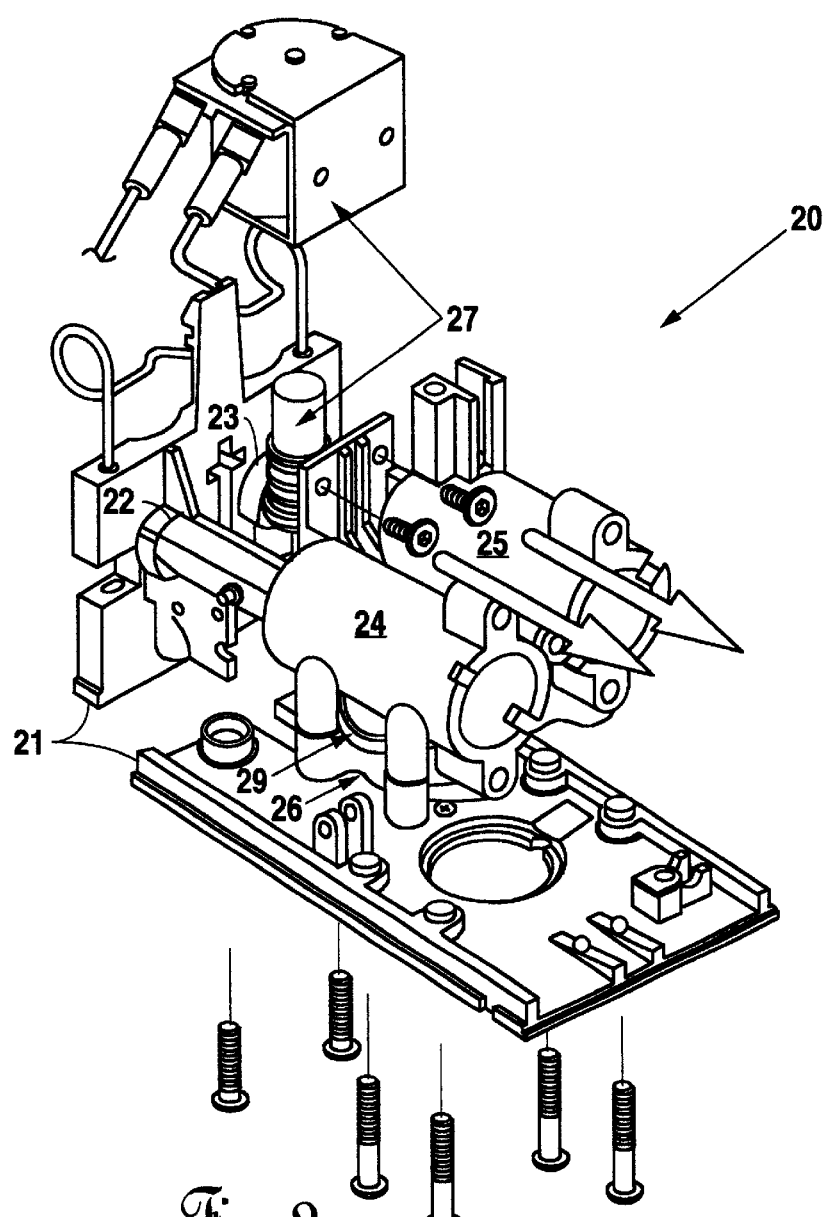
FIG. 2 is a perspective view illustrating a dispensing valve including paddle arms according to the preferred embodiment.

As illustrated in FIG. 2, a dispensing valve 20 includes a platform 21 that supports the remaining components of the dispensing valve 20. In this preferred embodiment, the dispensing valve 20 is an electric post-mix dispensing valve that receives syrup from a syrup source and a diluent, such as carbonated water or plain water, from a diluent source and combines the syrup and diluent at an outlet therefrom to provide a dispensed beverage. Although this preferred embodiment discloses a post-mix dispensing valve, those of ordinary skill in the art will readily recognize that any type of dispensing valve suitable to dispense a product therefrom may be implemented with the paddle arm disclosed herein.

The platform 21 supports a diluent inlet 22 and a syrup inlet 23 that communicate with respective flow rate controllers 24 and 25. The flow rate controllers 24 and 25 each communicate with an outlet 26 that facilitates the combination of the diluent and syrup into a dispensed beverage. In this preferred embodiment, the dispensing valve 20 includes a first paddle arm disposed at the outlet from the flow controller 24 and a second paddle arm disposed at the outlet from flow rate controller 25. The first and second paddle arms reside between the respective flow rate controllers 24 and 25 at a position referenced generally with numeral 29.

The platform 21 further supports a solenoid 27 that moves the first and second paddle arms from closed positions preventing flow from the flow rate controllers 24 and 25 to open positions permitting flow to the outlet 26. The platform still further supports a biasing mechanism, such as springs, that move the first paddle arm and the second paddle arm to their closed positions upon the deactivation of the solenoid 27.

Figure 3:
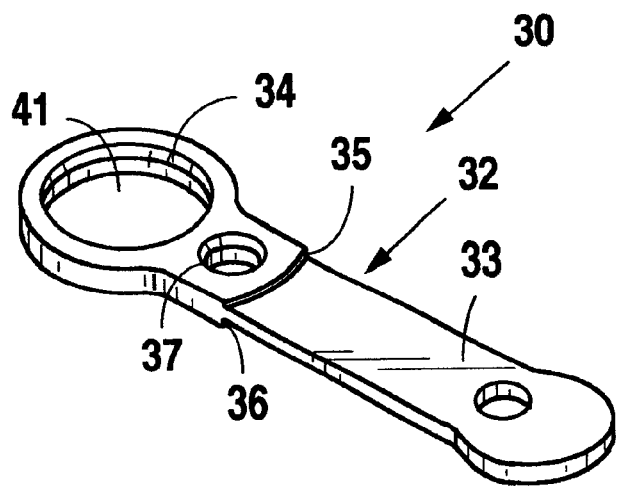
FIG. 3 is a perspective view illustrating a base of a paddle arm according to the preferred embodiment.
Figure 4:
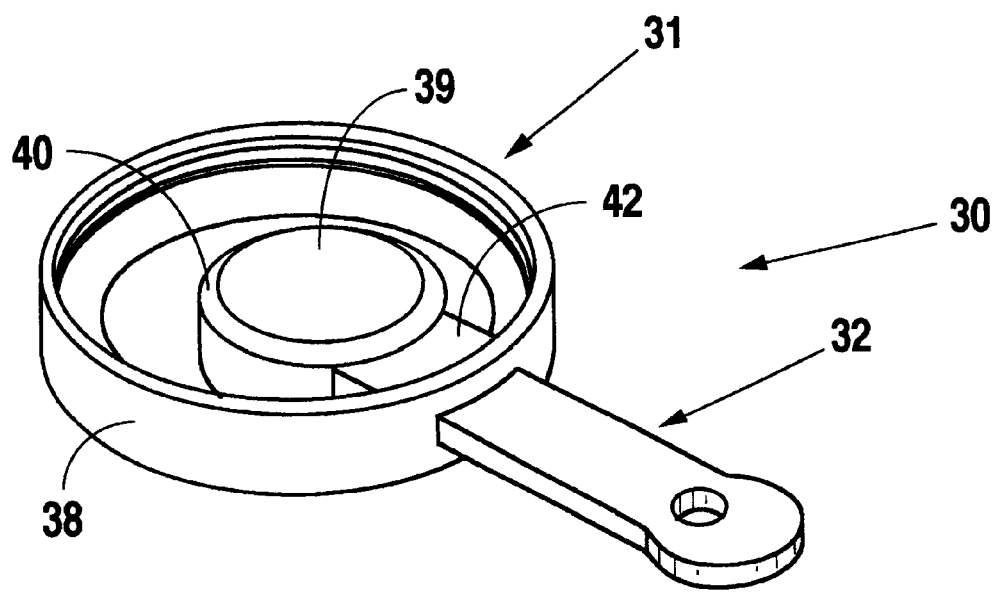
FIG. 4 is a perspective view illustrating a paddle arm according to the preferred embodiment.

As illustrated in FIGS. 3 and 4, a paddle arm 30 includes a seal 31 supported by a base 32. The base 32 includes a lever portion 33 and a seal-retaining portion 34. The base 32 further includes seal retaining support ridges 35 and 36 and a seal-retaining aperture 37 disposed on the lever portion 33. The seal-retaining portion 34 defines a through hole 41. The base 32 includes radiused edges to prevent abrading of a yoke that mechanically moves the paddle arm 30 responsive to the energizing of the solenoid 27. While the preferred embodiment includes a radiused edge, other types of edges, including angled edges may be used.

The seal 31 includes an outer sealing member 38 and an inner sealing block 39, which are disposed on the base 32 and integrally connected via a bridge 42. The inner sealing block includes an angled edge 40. While the preferred embodiment includes an angled edge, other types of edges, including radiused edges may be used. The seal 31 is formed and secured to the base 32 using any standard molding process. In this preferred embodiment, the seal 31 consists of a rubber compound having a durometer hardness number of 70 shore A.

The paddle arm 30 improves the operating life of the dispensing valve 20 through increased resistance to chloramines and "water hammer" problems. Increased resistance to chloramines occurs due to the selection of a rubber compound having a greater hardness. Overcoming "water hammer" problems results from the improved design of the base 32 to include the seal retaining support ridges 35 and 36 and the seal-retaining aperture 37. During the molding process, the outer sealing member 38 forms over the seal retaining support ridges 35 and 36, which extend into the outer sealing member 38, thereby providing greater support and stability to the outer sealing member 38 at its connection point to the base 32. Further, the rubber compound forming the seal 31 flows during the molding process into the seal retaining aperture 37, thereby enhancing the ability of the base 32 to support the outer sealing member 38. Thus, the paddle arm 30 resists "water hammer" and does not "blow-out" due to the dislodgment of the outer sealing member 38 from the base 32 because the seal support ridges 35 and 36 and the seal-retaining aperture 37 provide greater support and stability to the outer sealing member 38 at its connection point to the base 32.

The paddle arm 30 improves the operating quality of the dispensing valve 20 due to angled edge 40 and the through hole 41. The angled edge 40 provides enhanced syrup or diluent flow past the inner sealing block 39 due to its sloping design, which reduces flow turbulence. The through hole 41 provides the inner sealing block 39 with better sealing characteristics due to a hard sealing surface created by the seal-retaining portion 34 and a softer sealing surface created by the through hole 41 which includes only the material forming the inner sealing block 39.

Figure 5:
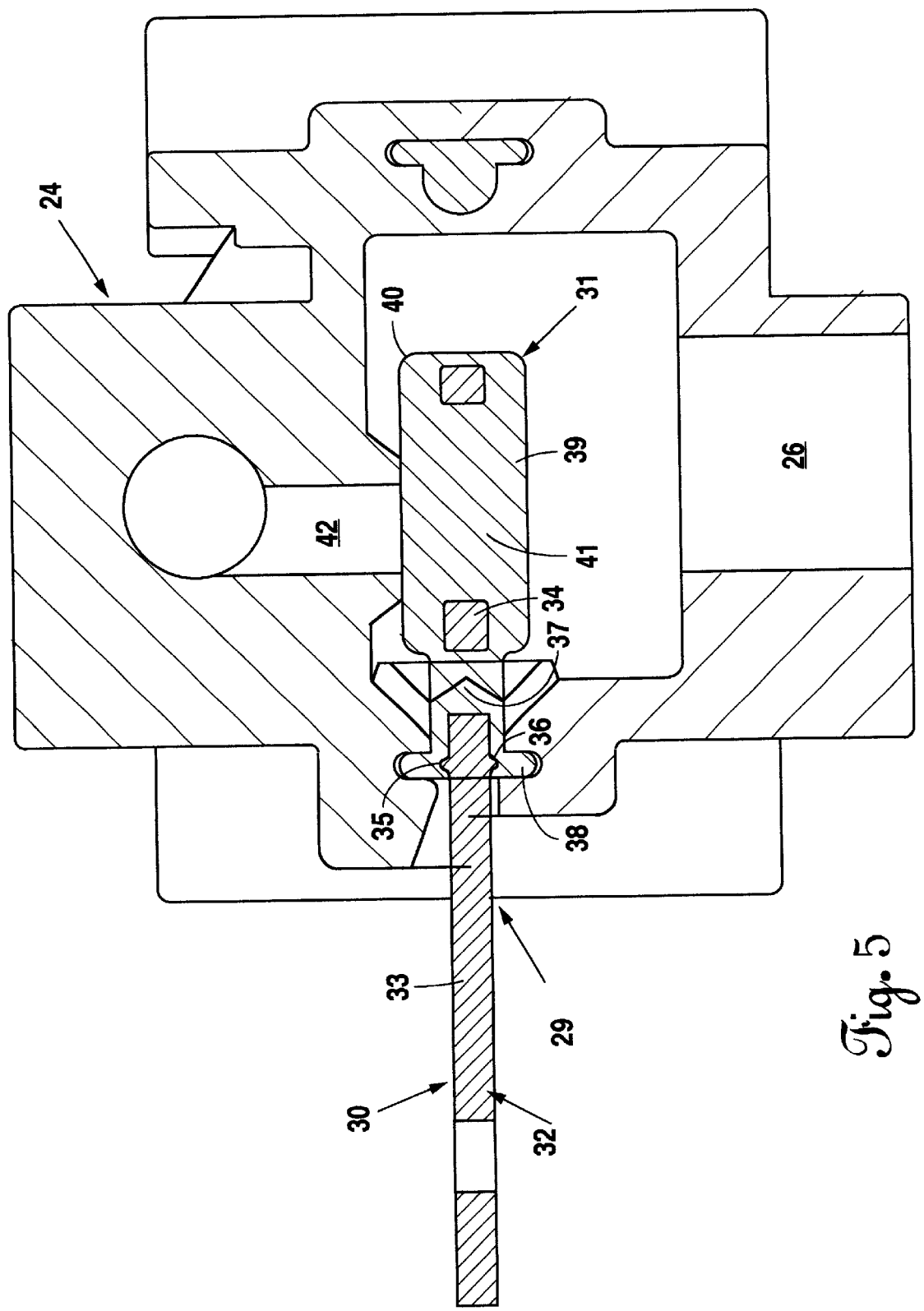
FIG. 5 is a partial cross-sectional view of the dispensing valve illustrating the placement of a paddle arm according to the preferred embodiment within the dispensing valve.

As illustrated in FIGS. 2 and 5, a paddle arm 30 as utilized at position 29 of the flow rate controller 24 is located to stop and start diluent flow through the flow rate controller 24. A paddle arm 30 is also utilized at position 29 of the flow rate controller 25 to stop and start syrup flow through the flow rate controller 25. However, any such paddle arm 30 for the flow controller 25 will not be described, as its operation is identical to that of the paddle arm 30 used in flow rate controller 24. Upon the energizing of the solenoid 27 in response to a user input, the lever portion 33 of the paddle arm 30 pivots, thereby moving the inner sealing member 39 of the seal 31 from the channel 42 of the flow rate controller 24. As a result, diluent flows past the inner sealing block 39 and from the outlet 26. Upon the denergizing of the solenoid 27, the biasing device moves the lever portion 33 of the paddle arm 32 to its original position thereby returning the inner sealing block 39 over the channel 42 to stop the flow of diluent.

As previously stated, the seal retaining support ridges 35 and 36 in combination with the seal retaining aperture 37 support the seal 31 along the outer sealing member 38 such that the paddle arm 30 does not experience premature "blowout" as a result of a "water hammer" effect. Furthermore, the designs of the inner sealing block 39 and the seal retaining portion 34 provide a better seal to the flow of syrup as well as better flow upon the movement of the inner sealing member 39 to its open position. The paddle arm 30, therefore, provides improved operating life and quality to the dispensing valve 20 in that it resists "blowout" as well as chloramines typically found in diluent provided from a public water source.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims that follow.

We claim:

1. A paddle arm, comprising:
    a base, comprising:
        a lever portion,
        a seal-retaining portion, and
        a seal retaining support ridge disposed on the lever portion; and
    a seal mounted on the base, the seal comprising:
        an outer sealing member supported on the base at the seal retaining support ridge, and
        an inner sealing block supported on the seal-retaining portion.

2. The paddle arm according to claim 1, wherein the seal retaining support ridge provides greater support and stability to the outer sealing member at its connection point to the base.

3. The paddle arm according to claim 1, wherein the base further comprises a second seal retaining support ridge disposed on the lever portion to provide greater support and stability to the outer sealing member at its connection point to the base.

4. The paddle arm according to claim 1, wherein the lever portion includes a seal-retaining aperture.

5. The paddle arm according to claim 4, wherein the seal-retaining aperture aids in securing the seal to the base, thereby providing greater support and stability to the seal at its connection point to the base.

6. The paddle arm according to claim 1, wherein the seal-retaining portion defines a through hole.

7. The paddle arm according to claim 6, wherein the through hole provides the inner sealing block with better sealing characteristics.

8. The paddle arm according to claim 1, wherein the base includes radiused edges.

9. The paddle arm according to claim 1, wherein the base includes angled edges.

10. The paddle arm according to claim 1, wherein the outer sealing member and the inner sealing block are integrally connected via a bridge.

11. The paddle arm according to claim 1, wherein the inner sealing block includes an angled edge.

12. The paddle arm according to claim 1, wherein the inner sealing block includes a radiused edge.

13. The paddle arm according to claim 11, wherein the angled edge enhances product flow past the inner sealing block.

14. The paddle arm according to claim 12, wherein the radiused edge enhances product flow past the inner sealing block.

15. The paddle arm according to claim 1, wherein the seal comprises a rubber compound having a durometer hardness number selected to resist chloramines.

16. A dispensing valve, comprising:
   a platform;
   a product inlet supported on the platform;
   a product outlet supported on the platform;
   a flow rate controller receiving product from the product inlet and communicating product to the product outlet;
   a paddle arm disposed at an outlet from the flow rate controller and movable from a closed position stopping product flow to an open position allowing product flow, the paddle arm, comprising:
      a base, comprising:
         a lever portion,
         a seal-retaining portion,
         a seal retaining support ridge disposed on the lever portion, and
      a seal mounted on the base, the seal comprising:
         an outer sealing member supported on the base at the seal retaining ridge, and
         an inner sealing block supported on the seal-retaining portion;
   an actuator for moving the paddle arm to its open position; and
   a biasing mechanism for returning the paddle arm to its closed position.

17. The dispensing valve according to claim 16, wherein the seal retaining support ridge provides greater support and stability to the outer sealing member at its connection point to the base.

18. The dispensing valve according to claim 16, wherein the base of the paddle arm further comprises a second a seal retaining support ridge disposed on the lever portion to provide greater support and stability to the outer sealing member at its connection point to the base.

19. The dispensing valve according to claim 16, wherein the lever portion includes a seal-retaining aperture that aids in securing the seal to the base, thereby providing greater support and stability to the seal at its connection point to the base.

20. The dispensing valve according to claim 16, wherein the seal-retaining portion defines a through hole that provides the inner sealing block with better sealing characteristics.

21. The dispensing valve according to claim 16, wherein the base includes radiused edges.

22. The dispensing valve according to claim 16, wherein the base includes angled edges.

23. The dispensing valve according to claim 16, wherein the outer sealing member and the inner sealing block are integrally connected via a bridge.

24. The dispensing valve according to claim 16, wherein the inner sealing block includes an angled edge that enhances product flow past the inner sealing block.

25. The dispensing valve according to claim 16, wherein the inner sealing block includes a radiused edge that enhances product flow past the inner sealing block.

26. The dispensing valve according to claim 16, wherein the seal comprises a rubber compound having a durometer hardness number selected to resist chloramines.

27. The dispensing valve according to claim 16, wherein the actuator comprises a solenoid.

* * * * *